May 7, 1968
C. S. BEAUDOIN ET AL
3,381,400
ADVERTISING DISPLAY DEVICE
Filed Dec. 23, 1965
2 Sheets-Sheet 1
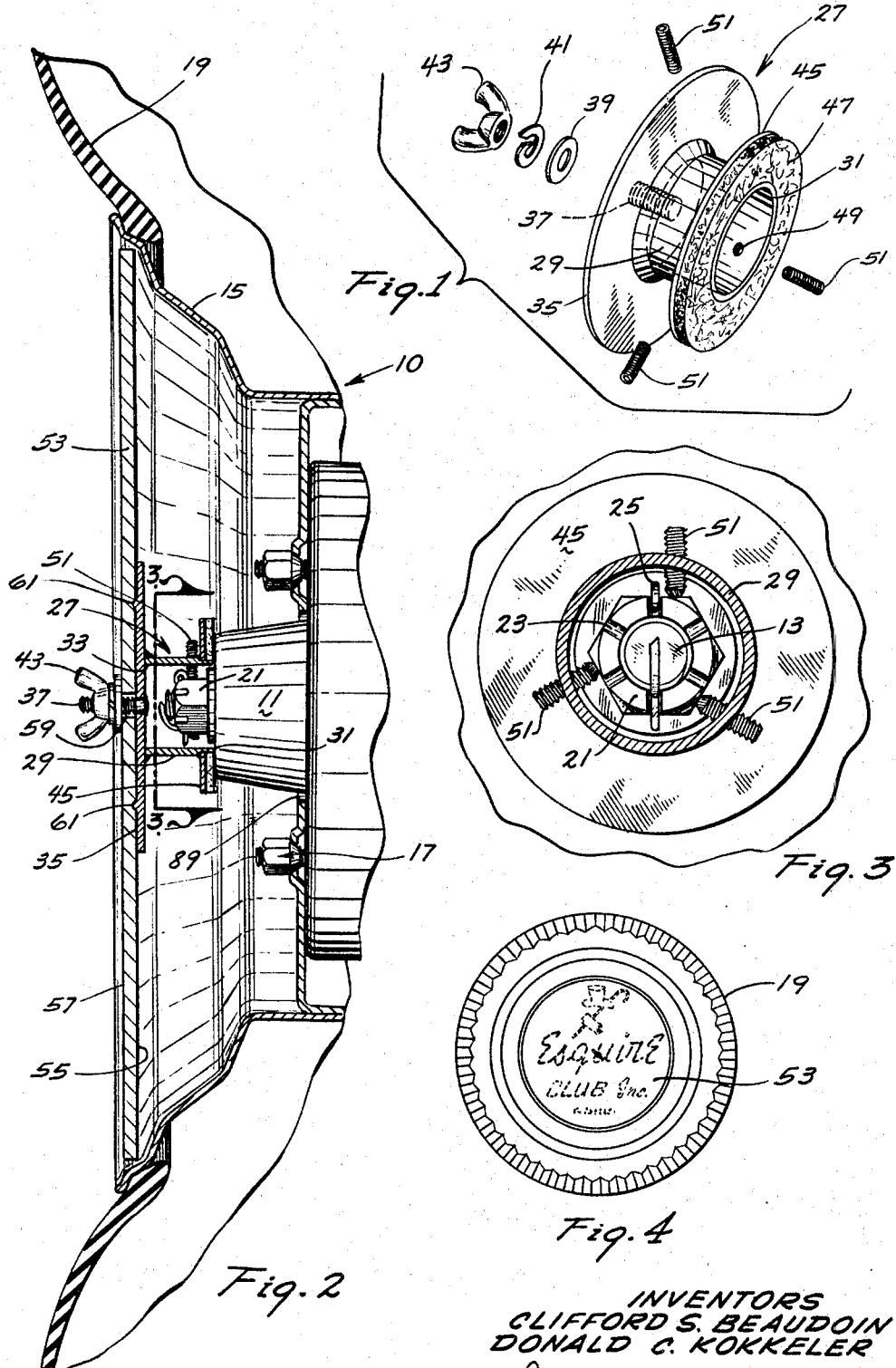
INVENTORS
CLIFFORD S. BEAUDOIN
DONALD C. KOKKELER
BY Duck, Zarley, McKee & Thomte
ATTORNEYS May 7, 1968     C. S. BEAUDOIN ET AL     3,381,400
ADVERTISING DISPLAY DEVICE

INVENTORS
CLIFFORD S. BEAUDOIN
DONALD C. KOKKELER

United States Patent Office 3,381,400
Patented May 7, 1968

3,381,400
ADVERTISING DISPLAY DEVICE
Clifford S. Beaudoin 820 10th Ave. W., Dickinson, N. Dak. 58601, and Donald C. Kokkeler, Belfield, N. Dak. 58622
Filed Dec. 23, 1965, Ser. No. 515,900
4 Claims. (Cl. 40—129)

This invention relates to an improved advertising display device and more particularly relates to a quick attachable advertising display device adapted for use on vehicle wheels.

Advertising display devices adapted for use on vehicle wheels have heretofore been unsatisfactory for several reasons, among them being: (1) the existing devices are not easily and quickly attachable to a vehicle wheel; (2) the existing devices are not adapted to be operatively rigidly secured to the vehicle axle assembly which causes said devices to become disengaged therefrom; (3) the existing devices permit foreign material such as dust or the like to enter the vehicle wheel bearings; and (4) the existing devices are difficult and expensive to manufacture.

Therefore, it is a principal object of this invention to provide an improved advertising display device adapted for use on vehicle wheels.

A further object of this invention is to provide an advertising display disc which is quickly and easily secured to a vehicle axle assembly.

A further object of this invention is to provide an advertising display device which will not become disengaged from the vehicle axle assembly.

A further object of this invention is to provide an advertising display device having a means thereon to prevent foreign material from entering the vehicle wheel bearings.

A further object of this invention is to provide an advertising display device which is operatively secured to a vehicle wheel but does not rotate therewith.

A further object of this invention is to provide an advertising display device which is easy to manufacture.

A further object of this invention is to provide an advertising display device which is durable in use and refined in appearance.

A further object of this invention is to provide an advertising display device which includes a supporting means which is operatively secured to an axle nut and which need not be removed therefrom when the vehicle wheel is removed from the hub means.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is an exploded rear perspective view of the display disc supporting means;

FIG. 2 is a partial sectional view of the advertising display device mounted on a vehicle wheel;

FIG. 3 is an enlarged sectional view of the device as seen on line 3—3 of FIG. 2;

FIG. 4 is a side view of the advertising display device mounted on a vehicle wheel;

Figure 5:
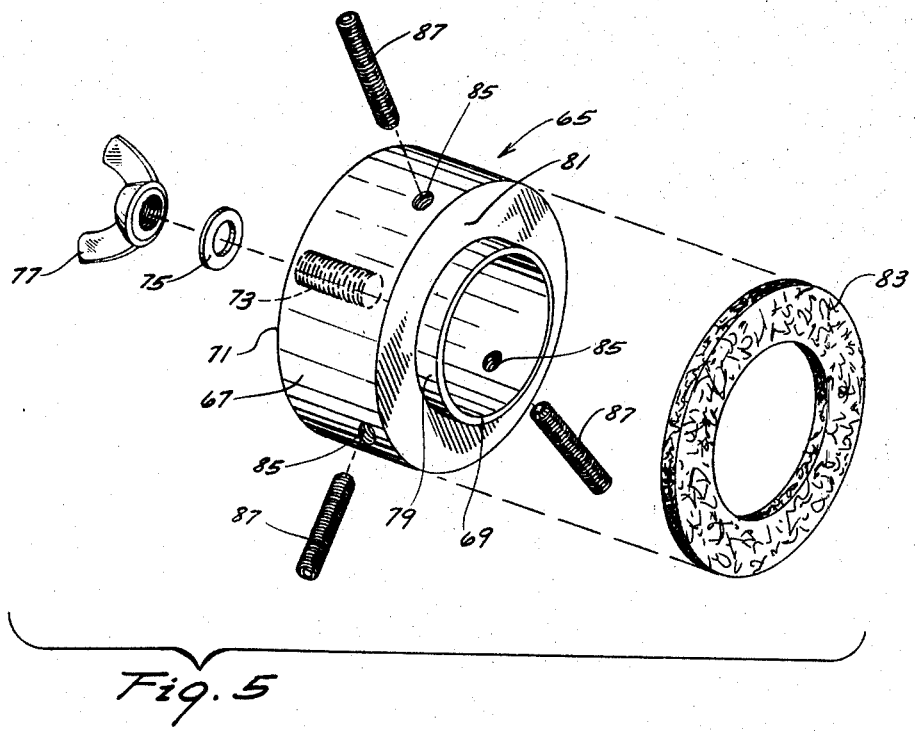
FIG. 5 is an exploded rear perspective view of a modification of the display disc supporting means.

In FIG. 2, the numeral 10 generally designates a vehicle wheel assembly including a rotatable hub 11 having a non-rotatable axle 13 extending therethrough and a wheel rim 15 operatively secured to hub 11 by means of stud bolt and nut assembly 17. A tire 19 is mounted on rim 15 in conventional fashion as partially illustrated in FIG. 2. The outer end of axle 13 is externally threaded and is adapted to threadably receive a hexagonal axle nut 21 thereon. Axle nut 21 is of conventional design and is provided with a plurality of notches 23 formed therein. A cotter pin 25 extends through a pair of aligned notches 23 and axle 13 to prevent rotation of nut 21 with respect to axle 13. Conventional wheel bearings are mounted in hub 11 and embrace axle 13 to permit rotation therebetween.

The numeral 27 generally designates the disc supporting means as best seen in FIG. 1. Disc supporting means 27 includes a hollow cylinder 29 having inner and outer ends 31 and 33 respectively. As best illustrated in FIGS. 2 and 3, the inner end 31 of cylinder 29 is adapted to receive axle nut 21 therein. An outer disc-shaped flange 35 is secured to the outer end 33 of cylinder 29 and extends transversely to the longitudinal axis of cylinder 29. A stud bolt 37 is secured to the outer surface of flange 35 at the center thereof by any convenient means such as by welding or the like and extends transversely outwardly therefrom. Stud bolt 37 is externally threaded and is adapted to receive a flat washer 39 and a lock washer 41 thereon and to threadably receive a wing nut 43.

An inner disc-shaped flange 45 is secured to cylinder 29 by any convenient means such as by welding or the like at a point outwardly of the inner end 31 of cylinder 29 and extends transversely therefrom. A seal 47 is secured to the inner surface of flange 45 by any suitable means such as by an adhesive or the like and is comprised of a hair-felt substance. Seal 47 is of a sufficient thickness so that the inner surface thereof terminates in the same plane as the inner end 31 of cylinder 29 or slightly inwardly thereof.

Cylinder 29 is provided with a plurality of threaded bores 49 extending therethrough obliquely to the surface thereof but transversely to the longitudinal axis of cylinder 29. Each of bores 49 are adapted to threadably receive a screw member 51 of the Allen type. Each of screw members 51 are provided with a knurled inner end adapted to engage one of the flat surfaces of axle nut 21.

The numeral 53 generally designates the advertising display disc having inner and outer surfaces 55 and 57 respectively. Disc 53 is provided with an aperture 59 at its center which is adapted to receive stud bolt 37. The outer surface of flange 35 is provided with a plurality of protrusions 61 extending outwardly therefrom which are adapted to engage the inner surface 55 of disc 53 when disc 53 is operatively mounted on stud bolt 37 to prevent rotation of disc 53 with respect to flange 35.

Disc 53 may be constructed of any suitable material such as Masonite, plastic, metal or the like. Disc supporting means 27 may be of one piece construction, that is, cylinder 29 and flanges 35 and 45 may be milled out of a single piece of material or flanges 35 and 45 may be welded to cylinder 29. Flanges 35 and 45 and cylinder 29 may be constructed of any suitable metal material such as steel, iron, or aluminum alloys and the like. The advertising media may be painted on the outer surface of disc 53 or applied in any other suitable manner.

Figure 6:
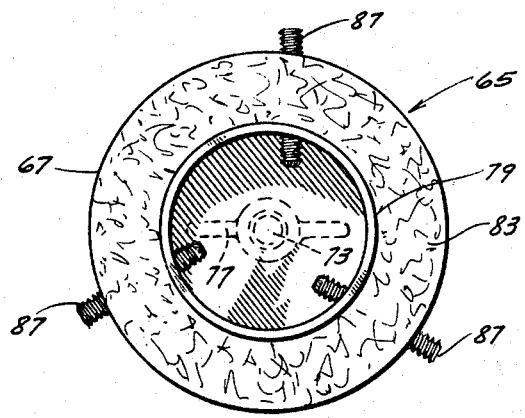
FIG. 6 is a rear elevational view of the modified display disc supporting means seen in FIG. 5.

In FIGS. 5 and 6, the numeral 65 generally designates a modification of the disc supporting means. Disc supporting means 65 is comprised of a hollow cylinder 67 having inner and outer ends 69 and 71 respectively. A stud bolt means 73 is operatively secured to the outer end 71 of cylinder 67 at the center thereof and extends outwardly therefrom. Stud bolt means 73 is adapted to receive a conventional washer 75 thereon and to threadably receive a wing nut 77. The outer end of cylinder 67 is provided with a plurality of protrusions (not shown) extending outwardly therefrom which are adapted to engage the inner surface 55 of disc 53 when disc 53 is operatively mounted on stud bolt means 73 to prevent rotation of disc 53 with respect to cylinder 67. The protrusions on the outer end of cylinder 67 are identical to and serve the same purpose as protrusions 61 on the outer surface of flange 53.

Cylinder 67 is provided with a reduced diameter portion 79 at its inner end thereby defining a shoulder 81. A seal 83 is secured to reduced diameter portion 79 and to shoulder 81 by any suitable means such as by an adhesive or the like and is comprised of a hair-felt substance. Seal 83 is of a sufficient thickness so that the inner surface thereof terminates in the same plane as the inner end 69 of cylinder 67 or slightly inwardly thereof.

Cylinder 67 is provided with a plurality of threaded bores 85 extending therethrough obliquely to the surface thereof but transversely to the axis of cylinder 67. Each of bores 85 are adapted to threadably receive a screw member 87 of the Allen type. Each of screw members 87 are provided with a knurled inner end adapted to engage one of the flat surfaces of axle nut 21 adjacent one end thereof. Disc 53 is adapted to be received on stud bolt means 73 and secured thereon by means of washer 75 and wing nut 77.

The device of FIGS. 1–4 is mounted on a vehicle wheel as follows: The hub cap normally mounted on the vehicle wheel is removed therefrom by any convenient means. The dust cap covering axle nut 21 is removed from the outer end of hub 11 by means of a screwdriver or the like. Disc supporting means 27 is positioned on the vehicle wheel so that the hollow inner end 31 of cylinder 29 receives axle nut 21 (FIG. 2) and so that the inner surface of seal 47 is positioned against the outer end of hub 11 (FIG. 2). The elongated screw members 51 in bores 49 are then threadably moved inwardly with respect to cylinder 29 by means of an Allen wrench or the like. Obviously, screw members 51 are alternately threadably moved inwardly so that the axle nut 21 and axle 13 will be positioned in the approximate center of cylinder 29. Disc supporting means 27 is rotated with respect to axle nut 21 so that the knurled inner ends of screw members 51 engages various of the flat surfaces of the axle nut 21 adjacent one end thereof as best illustrated in FIG. 3. It can be appreciated that the oblique relationship of the screw members 51 with respect to the surface of cylinder 29 causes the longitudinal axis of screw members 51 to be perpendicular to the respective flat surfaces of axle nut 21. The fact that the knurled inner ends of screw members 51 engage the flat surfaces of axle nut 21 adjacent one end thereof not only removes the screw members 51 from the vicinity of notches 23 in axle nut 21 but also positively prevents any rotational movement of cylinder 29 with respect to axle nut 21. Any attempted rotational movement of cylinder 29 with respect to axle nut 21 is prevented by the knurled inner ends of screw members 51 digging into the flat surfaces of axle nut 21.

After screw members 51 have been securely tightened on axle nut 21, disc 53 is positioned on stud bolt 37 as previously described. Flat washer 39, lock washer 41 and wing nut 43 are then mounted on stud bolt 37 and wing nut 43 is slightly tightened. Disc 53 is then rotated with respect to disc supporting means 27 so that the advertising media thereon is readable and the wing nut 43 is then securely tightened. The tightening of wing nut 43 causes protrusions 61 on the outer surface of flange 35 to engage the inner surface of disc 53 to aid in preventing any rotational movement of disc 53 with respect to disc supporting means 27. The device would be removed from the vehicle wheel in an order reverse to that just described.

The configuration of cylinder 29 permits the device to be secured to a variety of vehicle wheels regardless of the dimensions of axle nut 21. The diameter of disc 53 will be varied to correspond to the various wheel sizes upon which the device will be utilized.

The device described herein accomplishes new and useful results in the advertising display device art due to the unique structure thereof. A device has been described herein which permits quick and easy attachment of an advertising display disc to a vehicle wheel and which is operatively rigidly secured thereto. The device will not become inadvertently detached from the vehicle wheel and is extremely durable in use. Rotation of disc supporting means 27 with respect to axle 13 is prevented due to the unique relationship of screw members 51 and axle nut 21. Disc 53 is prevented from rotation with respect to disc supporting means 27 due to wing nut 43 and due to protrusions 61 on flange 35 engaging the inner surface of disc 53. Seal 47 engages the outer end of hub 11 to prevent foreign material from entering the interior of hub 11 to prevent damage to the wheel bearings therein.

The disc supporting means modification of FIGS. 5 and 6 is mounted on the axle nut 21 similarly as was the disc supporting means of FIGS. 1–4. The disc supporting means 65 accomplishes all of the results of disc supporting means 27 and is superior thereto for one reason. The diameter of disc supporting means 65 is less than the diameter of the central opening 89 in wheel means 15. This permits the wheel means 15 to be removed from the vehicle without removing disc supporting means 65. Therefore, in the modification of FIGS. 5 and 6, only display disc 53 need be removed when the vehicle wheel is to be removed. The screw members 87 of FIGS. 5 and 6 engage the axle nut 21 in identical fashion as do screw members 51 in FIGS. 1–4 and achieve the same results. Disc supporting means 65 may be constructed of any of the materials from which disc supporting means 27 may be constructed.

Thus it can be seen that the device accomplishes at least all of its stated objectives.

Some changes may be made in the construction and arrangement of our advertising display device without departing from the real spirit and purpose of our invention, and it is our intention to cover by our claims, any modified forms of structure or use of mechanical equivalents which may be reasonably included within their scope.

We claim:

1. In an attachment for a vehicle wheel assembly including a non-rotatable axle, a hub means rotatably mounted on said axle, a wheel means operatively secured to said hub means and an axle nut on said axle maintaining said hub means on said axle, a supporting means having inner and outer ends, the inner end of said supporting means being adapted to receive the axle nut therein, at least one elongated member threadably extending through said supporting means and having an inner end adapted to engage the axle nut to prevent rotation of said supporting means with respect to the axle nut, a flat disc means detachably securing said flat disc to the outer end of said supporting means, a first flange means being operatively secured to said supporting means adjacent the inner end thereof and extending transversely thereto, said first flange means including inner and outer surfaces, and a seal means operatively secured to the inner surface of said first flange means which engages the outer end of the hub means to prevent foreign material therein.

2. In an attachment for a vehicle assembly including a non-rotatable axle, a hub means rotatably mounted on said axle, a wheel means operatively secured to said hub means and an axle nut on said axle maintaining said hub means on said axle, a supporting means having inner and outer ends, the inner end of said supporting means being adapted to receive the axle nut therein, at least one elongated member threadably extending through said supporting means and having an inner end adapted to engage the axle nut to prevent rotation of said supporting means with respect to the axle nut, a flat disc means detachably securing said flat disc to the outer end of said supporting means, said supporting means being comprised of a hollow cylinder having a reduced diameter portion at its inner end, and a seal means embracing said reduced diameter portion, said seal means being adapted to engage the outer end of the hub means to prevent foreign material entering therein.

3. The attachment of claim 1 wherein said first flange means is spaced outwardly from the inner end of said supporting means.

4. In an attachment for a vehicle wheel assembly including a non-rotatable axle, a hub means rotatably mounted on said axle, a wheel means operatively secured to said hub means and an axle nut on said axle maintaining said hub means on said axle, a supporting means having inner and outer ends, the inner end of said supporting means being adapted to receive the axle nut therein, at least one elongated member threadably extending through said supporting means and having an inner end adapted to engage the axle nut to prevent rotation of said supporting means with respect to the axle nut, a flat disc means detachably securing said flat disc to the outer end of said supporting means, and a seal means operatively secured to said supporting means in the inner end thereof, said seal means adapted to engage the outer end of the hub means to prevent foreign material entering therein.

References Cited
UNITED STATES PATENTS

| | | | |
|---|---|---|---|
| 1,522,904 | 1/1925 | Pack et al. | 40—129 |
| 1,543,147 | 6/1925 | Zimmerman | 308—187.1 |
| 1,590,189 | 6/1926 | Hamilton | 40—129 |
| 2,548,070 | 4/1951 | Ryan | 40—129 |
| 2,741,047 | 4/1956 | Pollock | 40—129 |
| 2,782,871 | 2/1957 | Schjohn | 40—129 |

EUGENE R. CAPOZIO, *Primary Examiner.*

W. W. NIELSEN, *Assistant Examiner.*